April 8, 1969  E. L. COOK  3,437,143
FORMATION CONSOLIDATION
Filed Dec. 27, 1966
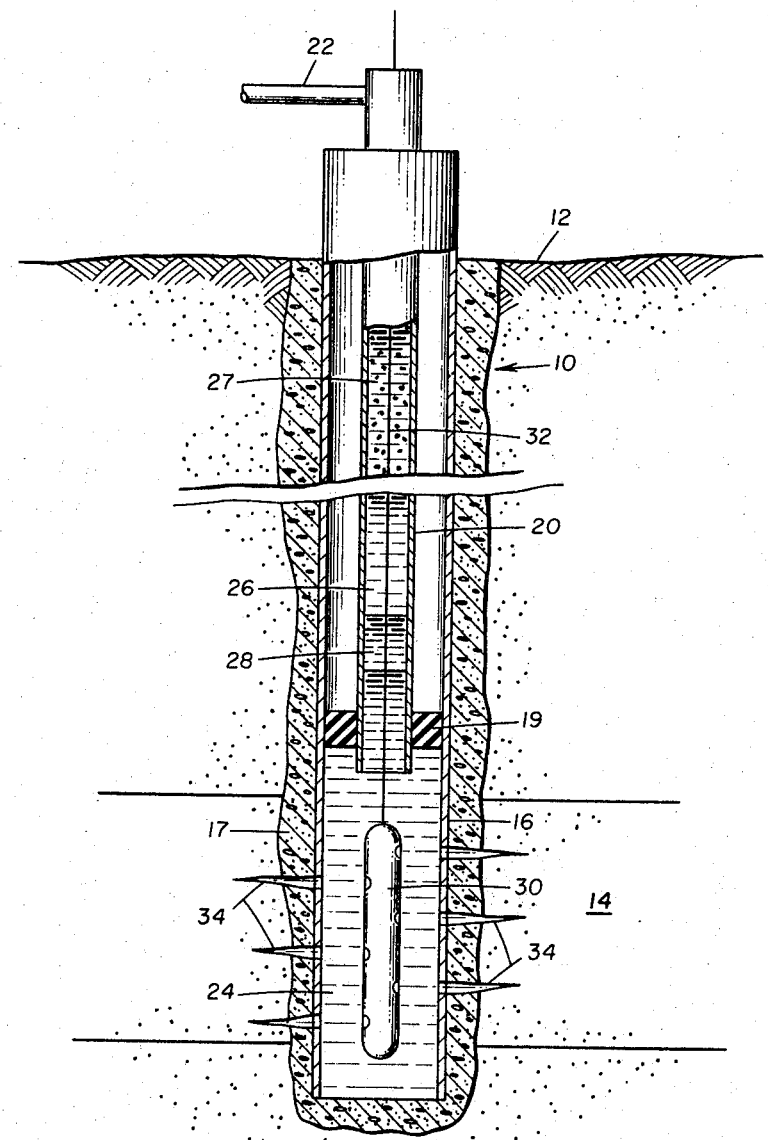
EVIN L. COOK
INVENTOR
BY
ATTORNEY United States Patent Office 3,437,143
Patented Apr. 8, 1969

3,437,143
FORMATION CONSOLIDATION
Evin L. Cook, Dallas, Tex., assignor to Mobil Oil
Corporation, a corporation of New York
Filed Dec. 27, 1966, Ser. No. 604,903
Int. Cl. E21b 43/11
U.S. Cl. 166—285                 3 Claims

ABSTRACT OF THE DISCLOSURE

A method of consolidating an incompetent formation surrounding a cased well wherein the interval of casing lying adjacent the incompetent formation is first filled with consolidating fluid. A perforating means is then lowered into said consolidating fluid and actuated in the presence of said fluid to form perforations in said casing and to force said fluid through said formed perforations and into the formation before detrital material from the formation can enter the well. Pressure is maintained in the casing until the consolidating fluid has cured.

Background of the invention

This invention relates to the consolidation of subterranean formations and, more particularly, to a method of introducing a consolidating fluid into a zone of an incompetent formation adjacent a well penetrating the formation.

Many problems are encountered in operating wells completed in so-called "incompetent" or unconsolidated formations. In such a well, sand or other detrital material may flow into the well along with the produced formation fluids such as oil, gas, water, or mixtures thereof. The presence of such detrital material may result in undesirable accumulations thereof at the bottom of the well and also cause difficulty in producing the fluids from the well and in handing the produced fluids at the surface. Further, the presence of sand or other detrital material may lead to erosion of downhole producing equipment such as tubing strings. This latter problem is particularly serious in gas wells in which the gas enters the well under a high velocity.

To overcome these problems various techniques have been developed in order to inhibit the flow of detrital material into a well along with the formation fluids. One conventional technique involves the provision of a gravel pack around the well bore which acts as a filter and prevents production of the formation sand. This technique leaves much to be desired because of the expense and effort required in installing the gravel pack. Also, difficulties often are encountered in removing the gravel pack when it is desired to recomplete or otherwise work over the well. A more recently proposed practice involves the stabilization of an incompetent formation by introducing a suitable consolidating fluid such as a solution of a thermosetting resin or other polymerizable material into the formation. While this technique shows considerable promise, it has not heretofore been consistently effective in controlling the production of sand or other detrital material from incompetent formations. One serious shortcoming of this technique stems from the difficulty of securing uniform and intimate contact between the unconsolidated formation particles and the injected consolidating agent.

Summary of the invention

In accordance with the present invention, there is provided a new and improved method of stabilizing incompetent formations which is alleviative of the difficulties heretofore encountered in the utilization of formation consolidating fluids. The instant invention is carried out in a well which penetrates a subterranean formation and has a casing therein adjacent the formation. In carrying out the method of the present invention, a consolidating fluid such as a solution of a thermosetting epoxy resin is disposed within an interval of the casing adjacent the formation to be consolidated. Thereafter, the casing is perforated within this interval in the presence of the consolidating fluid and the consolidating fluid is immediately forced through the perforations thus formed in the casing and into the adjacent formation. By this method intimate contact between the formation material and the consolidating agent is achieved and the formation is effectively stabilized, thus alleviating the flow of detrital material into the well.

Brief description of the drawing

For a better understanding of the present invention reference may be had to the following detailed description taken in conjunction with the accompanying drawing which is an illustration, partly in section, of a well within which the invention may be carried out.

Description of the preferred embodiments

With reference to the drawing, there is shown a wellbore 10 extending from the earth's surface 12 and penetrating a subterranean formation 14. The formation 14 may be, for example, an unconsolidated sandstone which is productive of oil and gas. The wellbore 10 is provided with a string of casing 16 which is cemented in a conventional manner to provide a cement sheath 17 interposed between the casing and the wall of the wellbore. The well also may be provided with a conventional packer 19 which isolates the subterranean formation 14 from the upper portion of the well and a tubing string 20 which extends from the surface of the well through the packer. The tubing string is provided with a suitable flowline 22 for the introduction or withdrawal of fluids from the well.

It will be understood that the system of production equipment thus far described is exemplary only and that other suitable systems may be used. For example, while only a single casing string 16 is shown, the well may be provided with a plurality of such casing strings. Thus, the well may be provided with a conductor pipe or surface casing and one or more intermediate casing strings as will be understood by those skilled in the art. Also, while the casing 16 is shown in the drawing as extending completely to the surface of the well it will be understood that other suitable arrangements may be utilized. For example, the casing 16 adjacent the formation 14 may take the form of a liner which is suspended from an additional casing string. Also, the casing adjacent the formation 14 may take the form of a so-called "scab liner" which does not extend up into a casing string but simply rests on the bottom of a well. Such a scab liner may be lowered into the well and then cemented in place by forcing cement out the bottom of the liner and up the annulus, or preformed openings in the liner into the annular space surrounding the liner. Such cement, of course, then hardens to form a seal which closes off such openings. Further, it will be recognized that packer 19 and tubing 20 may be dispensed with in which case fluids may be injected or withdrawn directly through the casing. These and other completion practices are well known to those skilled in the art and, therefore, will not be described further.

As a first step in carrying out the instant invention, a consolidating fluid 24 is injected into the well through the tubing 20 in an amount sufficient to cover an interval of casing adjacent the section of formation 14 which is to be perforated. Preferably, the consolidating fluid 24 is followed by an activator fluid 26 which, as will be understood by those skilled in the art, may be any material which reacts with the consolidating fluid to form a bonding material in the formation or which acts as an accelerator or catalyst for the consolidating fluid within the formation. The activator fluid is in turn displaced by a displacing fluid 27 which is inert with respect to the consolidating and activator fluids.

It usually will be desirable to provide for interface separation between the consolidating fluid 24 and the activator fluid 26. Thus, as shown in the drawing, a small slug 28 of an inert buffering fluid may be injected into the tubing immediately after the introduction of the consolidating fluid 24 but before the introduction of the activator fluid 26. In some cases, of course, such interface separation may be unnecessary as, for example, where the consolidating fluid and activator fluid exhibit a relatively high degree of immiscibility with respect to one another.

While the consolidating fluid may be of any suitable type, it usually will be desirable to utilize a polymerizable material, preferably a thermosetting resin. By way of example, the consolidating fluid may take the form of an epoxy resin solution, of the type described in U.S. Patent No. 3,100,527 to Hilton et al. If such a resin solution is used, the activator fluid 26 may take the form of a suitable accelerator for the epoxy resin. For example, the activator fluid may comprise a solution of tridimethyl amino methyl phenol, as described in the aforementioned patent to Hilton et al.

While it usually will be preferred to follow the consolidating fluid with a separate portion of activator fluid, it is to be understood that the invention may be carried out utilizing a consolidating fluid only. For example, the consolidating fluid may take the form of a resin-forming solution which contains a suitable delayed-action curing agent or catalyst. In this case it ordinarily will be desirable to delay the mixing of the resin and curing agent until just before injecting the consolidating fluid into the well in order to avoid premature setting of the resin within the casing. The consolidating fluid also may comprise an agent which reacts chemically with connate formation fluid to form a bonding material in situ. In any case, it will be understood that by the term "consolidating fluid" as used herein and in the appended claims, is meant a material which functions within the formation to bond the loose formation particles together.

After the consolidating fluid is disposed within the desired interval of the casing 16, the casing is perforated within this interval and immediately thereafter the consolidating fluid is forced through the perforations thus formed into the formation 14. The casing 16 may be perforated by any suitable procedure. Preferably, however, the perforation step is carried out by conventional gun or jet perforating techniques. For example, as shown in the drawings, a gun or jet perforator 30 may be lowered through the tubing 20 on a suitable wire line 32. The perforator then is fired in the presence of the consolidating fluid in order to form perforations such as indicated by reference numerals 34 in the casing 16. At the time the perforations 34 are formed, the pressure on the consolidating fluid 24 within the casing is greater, e.g., by virtue of the hydrostatic head within the well, than the pressure within the formation immediately surrounding the well bore. Thus, the consolidating fluid immediately flows through the perforations 34 into the surrounding formation before there is an opportunity for significant amounts of loose detrital material within the formation to move through the perforations 34 into the well with possible deleterious results such as enlargement of the perforations and the formation of silt deposits in the areas of the formation immediately adjacent the perforations. In addition, by initially exposing the areas of the formation adjacent perforations 34 to the consolidating fluid, contamination by fluids which may damage the formation is avoided. In this regard, perforation of the casing 16 and the surrounding portion of the formation 14 in the presence of a conventional completion fluid such as drilling mud will result in such fluid entering the formation. This procedure is partially irreversible and the presence in the formation of a fluid such as drilling mud may greatly decrease the effectiveness of a subsequently injected consolidating fluid.

The consolidating fluid 24 may be used in any suitable amount as dictated by local conditions. Preferably, however, the consolidating fluid is provided in an amount of at least one-fourth gallon for each perforation 34 formed in the casing. In most cases this will insure that at least a minimum effective zone extending radially from each perforation on the order of about 3 inches is contacted by the consolidating fluid.

The consolidating fluid, and separate portion of activator fluid if such is used, is forced into the formation by the displacing fluid 27, it being recognized that such additional displacing fluid as is necessary may be pumped into the well immediately after the perforating step. Preferably, the formation 14 is overflushed by the displacing fluid by forcing such fluid through the perforations 34 and into the formation subsequent to the consolidating or activator fluid. Thereafter the pressure in the well adjacent the formation 14 is maintained at a value at least as great as the formation pressure until the consolidating fluid has cured to effect stabilization of the formation. This will prevent substantial plugging of the formation interstices by the consolidating material and insure that permeability is maintained in the formation. The well pressure then may be reduced in order to produce the displacing fluid and the connate formation fluids such as oil and gas into the well.

Having described specific embodiments of the instant invention, it will be understood that further modifications thereof may be suggested to those skilled in the art, and it is intended to cover all such modifications as fall within the scope of the appended claims.

I claim:

1. In the stabilization of a subterranean formation penetrated by a well having a casing therein adjacent said formation, the method of:
   (a) introducing a consolidating fluid into said casing until the interval of said casing lying adjacent said formation is filled therewith;
   (b) lowering a penetrating means through said well into said consolidating fluid adjacent said formation;
   (c) actuating said penetrating means while said means is in said consolidating fluid to form perforations in said casing adjacent said formation;
   (d) forcing said consolidating fluid through said perforations into said formation at the instant said perforations are formed;
   (e) forcing an inert displacing fluid through said perforations and into said formation; and
   (f) maintaining the pressure in the well at a value at least as great as the pressure within said formation until said consolidating fluid has cured to effect stabilization of said formation.

2. In the stabilization of a subterranean formation generated by a well having a casing therein adjacent said formation, the method of:
   (a) introducing a consolidating fluid into said casing until the interval of said casing lying adjacent said formation is filled therewith;
   (b) lowering a penetrating means through said well into said consolidating fluid adjacent said formation;
   (c) actuating said penetrating means while said means is in said consolidating fluid to form perforations in said casing adjacent said formation;
   (d) forcing said consolidating fluid through said perforations into said formation at the instant said perforations are formed;
   (e) forcing an activator fluid through said perforations and into said formation; and
   (f) maintaining the pressure in the well at a value at least as great as the pressure within said formation until said consolidating fluid has cured to effect stabilization of said formation.

3. The method of claim 2 further comprising:

forcing an inert displacing fluid through said perforations and into said formation subsequent to step (e) and prior to step (f).

References Cited

UNITED STATES PATENTS

| | | | |
|---|---|---|---|
| Re. 25,747 | 3/1965 | Hilton et al. | 166—33 |
| 2,378,817 | 6/1945 | Wrightsman et al. | 166—33 |
| 2,718,264 | 9/1955 | Allen et al. | 166—35 X |
| 3,097,692 | 7/1963 | Holland et al. | 166—33 |
| 3,273,659 | 9/1966 | Reynolds | 166—100 X |
| 3,336,980 | 8/1967 | Rike | 166—35 X |
| 3,347,315 | 10/1967 | Lanmon | 166—23 |

CHARLES E. O'CONNELL, *Primary Examiner.*

IAN A. CALVERT, *Assistant Examiner.*

U.S. Cl. X.R.

166—297